US006551690B2

(12) United States Patent
Dwinell

(10) Patent No.: US 6,551,690 B2
(45) Date of Patent: Apr. 22, 2003

(54) WINDOW STABILIZING DEVICE

(76) Inventor: Theo Marie Dwinell, 1762 N. Sherry La., Santa Ana, CA (US) 92705

(*) Notice: Subject to any disclaimer, the term of this patent is extended or adjusted under 35 U.S.C. 154(b) by 71 days.

(21) Appl. No.: 09/829,279

(22) Filed: Apr. 9, 2001

(65) Prior Publication Data

US 2002/0146539 A1 Oct. 10, 2002

(51) Int. Cl.[7] .............................. B32B 3/00; E04B 2/82; E06B 3/00

(52) U.S. Cl. ...................... 428/156; 428/192; 52/126.1; 52/204.5; 52/204.56

(58) Field of Search ................................ 428/156, 192, 428/174; 248/188.2; 52/126.1, 204.56, 204.5, 217; 292/344, 343, DIG. 47

(56) References Cited

U.S. PATENT DOCUMENTS

| | | | | | |
|---|---|---|---|---|---|
| 377,927 | A | * | 2/1888 | Campbell | 292/343 |
| 1,351,453 | A | * | 8/1920 | Wells | 292/343 |
| 4,830,320 | A | * | 5/1989 | Bellows | 248/188.2 |
| 5,340,176 | A | * | 8/1994 | Cresci | 292/343 |

* cited by examiner

*Primary Examiner*—Donald J. Loney
(74) *Attorney, Agent, or Firm*—Goldstein & Lavas, P.C.

(57) ABSTRACT

A window stabilizing device including a wedge portion dimensioned for being positioned between a lower edge of a window and a corresponding window frame or sill. The wedge portion has a generally triangular configuration. The wedge portion has a top wall, a bottom wall, opposed side walls, a forward edge, and a raised rearward edge. The forward edge and the raised rearward edge are disposed whereby the top wall is angularly disposed.

4 Claims, 2 Drawing Sheets

WINDOW STABILIZING DEVICE

BACKGROUND OF THE INVENTION

The present invention relates to a window stabilizing device and more particularly pertains to preventing a loose window from rattling.

Windows, particularly in older homes, tend to rattle when confronted with windy conditions. Many homeowners do not wish to bear the cost of replacing or repairing these windows and are often forced to jam various household items between the window and the window frame or sill in order to stop the window from rattling. Some of these items may cause even more damage to the window, and possibly will damage the window frame and sill. What is needed is a device that is specifically designed to be safely positioned between a loose window and a window frame or sill in order to effectively stop the loosed window from rattling.

The present invention attempts to solve above-mentioned problem by providing a device that is specifically designed for preventing a loose window from rattling.

The use of window accessory devices is known in the prior art. More specifically, window accessory devices heretofore devised and utilized for the purpose of preventing windows from being opened are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,340,176 to Cresci discloses a window wedge used to limit the amount the window can be opened. U.S. Pat. Nos. 2,472,216 to Kasik and 5,552,768 to Mikiel disclose additional wedge devices for use with windows.

While these devices fulfill their respective, particular objective and requirements, the aforementioned patents do not describe a window stabilizing device for preventing a loose window from rattling and other things.

In this respect, the window stabilizing device according to the present invention substantially departs from the conventional concepts and designs of the prior art, and in doing so provides an apparatus primarily developed for the purpose of preventing a loose window from rattling.

Therefore, it can be appreciated that there exists a continuing need for a new and improved window stabilizing device which can be used for preventing a loose window from rattling. In this regard, the present invention substantially fulfills this need.

SUMMARY OF THE INVENTION

In the view of the foregoing disadvantages inherent in the known types of window accessory devices now present in the prior art, the present invention provides an improved window stabilizing device. As such, the general purpose of the present invention, which will be described subsequently in greater detail, is to provide a new and improved window stabilizing device which has all the advantages of the prior art and none of the disadvantages.

To attain this, the present invention essentially comprises a wedge portion dimensioned for being positioned between a lower edge of a window and a corresponding window frame or sill. The wedge portion is constructed of a flexible plastic. The wedge portion has a generally triangular configuration. The wedge portion has a top wall, a bottom wall, opposed side walls, a forward edge, and a raised rearward edge. The forward edge and the raised rearward edge are disposed whereby the top wall is angularly disposed. The top wall and the bottom wall each have an indentation formed therein disposed inwardly of the raised rearward edge.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved window stabilizing device which has all the advantages of the prior art window accessory devices and none of the disadvantages.

It is another object of the present invention to provide a new and improved window stabilizing device which may be easily and efficiently manufactured and marketed.

It is a further object of the present invention to provide a new and improved window stabilizing device which is of durable and reliable construction.

An even further object of the present invention is to provide a new and improved window stabilizing device which is susceptible of a low cost of manufacture with regard to both materials and labor, and which accordingly is then susceptible of low prices of sale to the consuming public, thereby making such a window stabilizing device economically available to the buying public.

Even still another object of the present invention is to provide a new and improved window stabilizing device for preventing a loose window from rattling.

Lastly, it is an object of the present invention to provide a new and improved window stabilizing device including a wedge portion dimensioned for being positioned between a lower edge of a window and a corresponding window frame or sill. The wedge portion has a generally triangular configuration. The wedge portion has a top wall, a bottom wall, opposed side walls, a forward edge, and a raised rearward edge. The forward edge and the raised rearward edge are disposed whereby the top wall is angularly disposed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
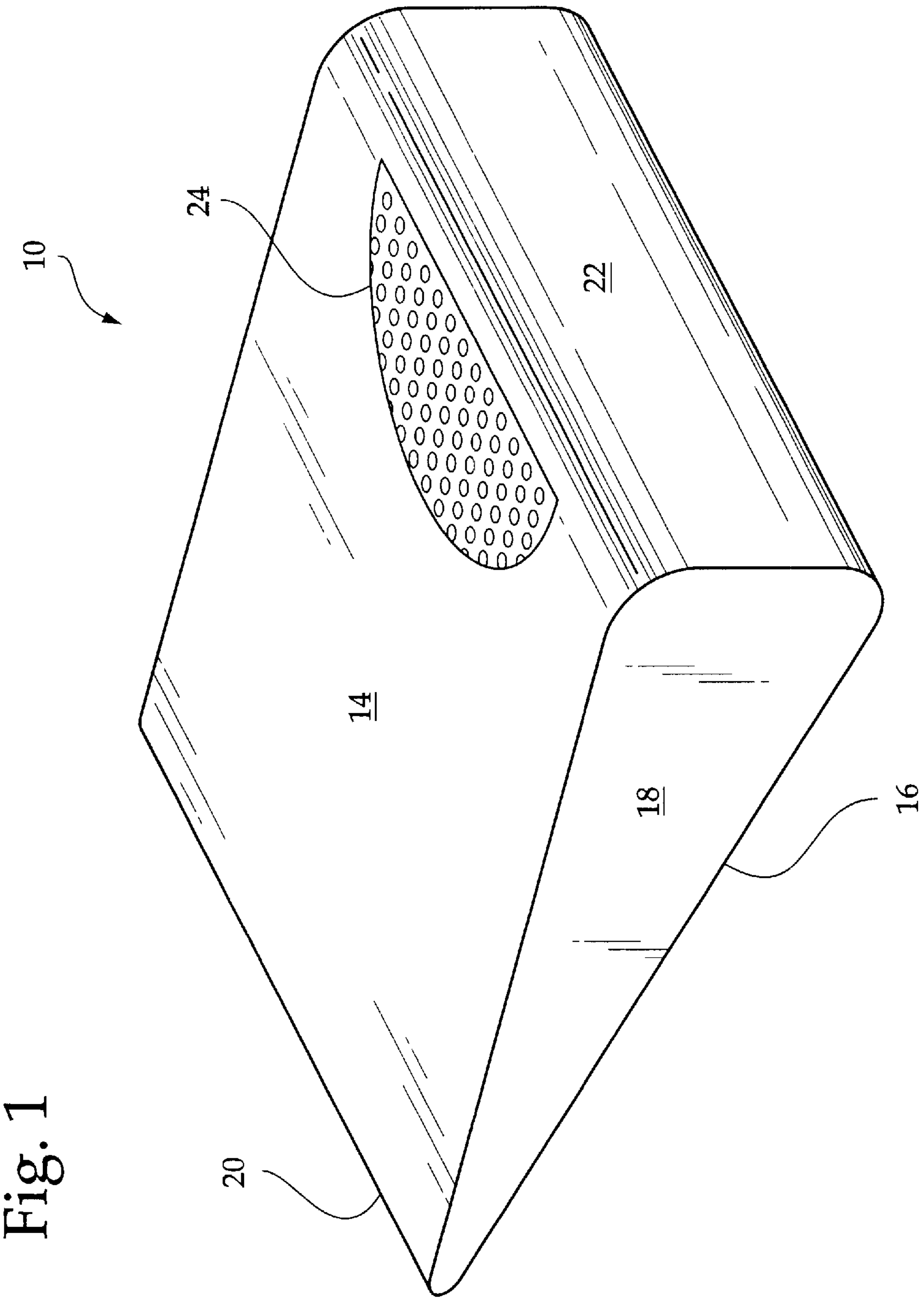
FIG. 1 is a perspective view of the preferred embodiment of the window stabilizing device constructed in accordance with the principles of the present invention.
Figure 2:
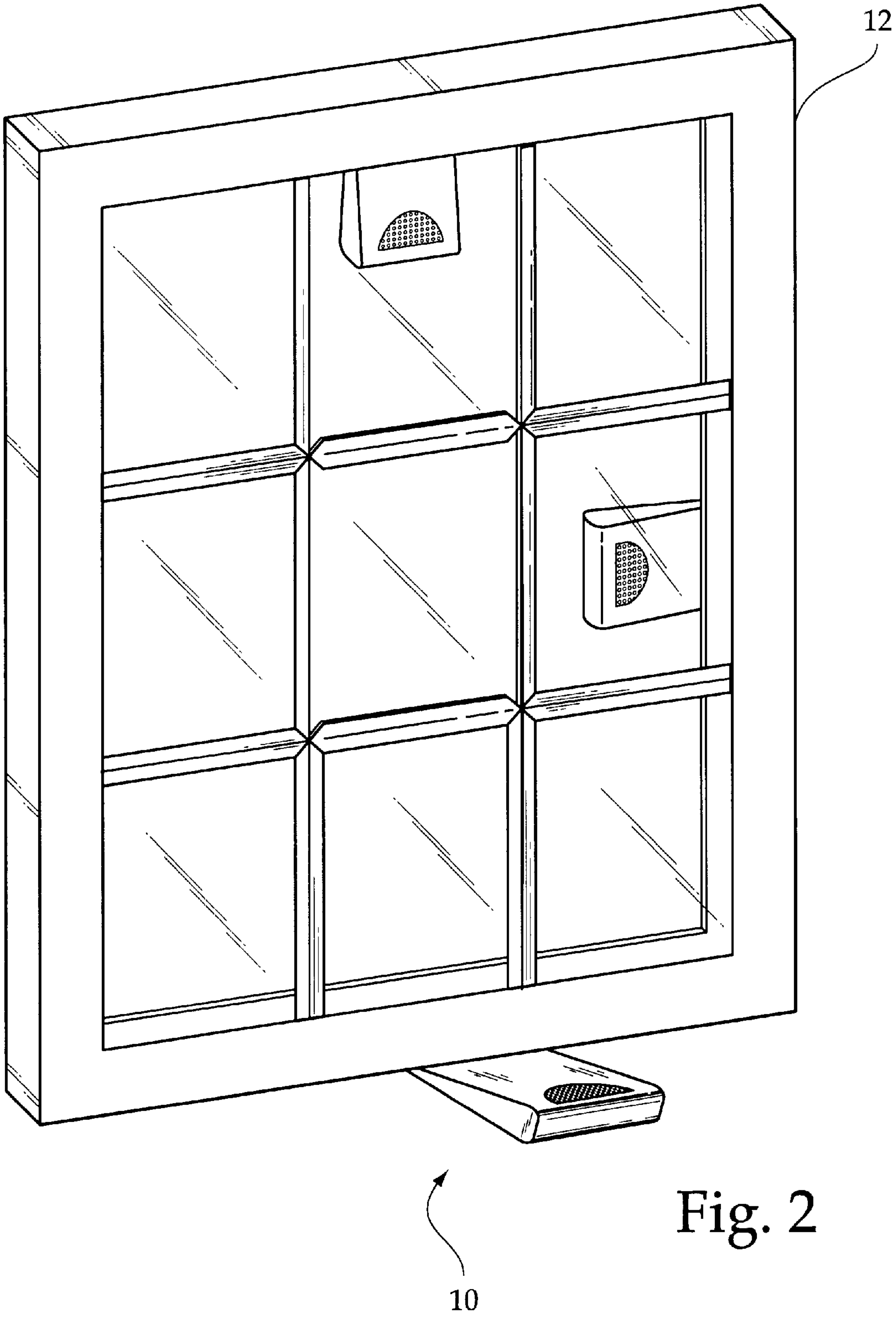
FIG. 2 is a perspective view of the present invention illustrated in use.

With reference now to the drawings, and in particular, to FIGS. 1 through 2 thereof, the preferred embodiment of the new and improved window stabilizing device embodying the principles and concepts of the present invention and generally designated by the reference number 10 will be described.

Specifically, it will be noted in the various figures that the device relates to a window stabilizing device for preventing a loose window from rattling.

The present invention is essentially comprised of a wedge portion 10. The wedge portion 10 is dimensioned for being positioned between a lower edge of a window 12 and a corresponding window sill. The wedge portion 10 is constructed of a flexible plastic. The flexible plastic construction of the wedge portion will prevent any possible damage to the window 12 and the window frame or sill. The wedge portion 10 has a generally triangular configuration. The wedge portion 10 has a top wall 14, a bottom wall 16, opposed side walls 18, a forward edge 20, and a raised rearward edge 22. The edges of the wedge portion 10 will be rounded and smooth to also prevent damage to the window 12 and the window sill. The forward edge 20 and the raised rearward edge 22 are disposed whereby the top wall 14 is angularly disposed. The top wall 14 and the bottom wall 16 each have an indentation 24 formed therein disposed inwardly of the raised rearward edge 22. The indentations 24 will facilitate the handling of the present invention when trying to position it between the window 12 and the window frame or sill. The indentations 24 can be provided with an abrasive surface that will aid in the handling.

The wedge portion 10 can come in a plurality of sizes that can be used depending on the size of the space between the window 12 and the window frame or sill. More than one wedge portion 10 can be used when the window 12 is significantly loose.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A window stabilizing device for preventing a loose window from rattling comprising, in combination:

a window having a lower edge;

a window sill adjacent the lower edge, wherein a space is present between the lower edge and the window sill; and a wedge portion selectively positioned between the lower edge of a window and the corresponding window sill to stop the window from rattling, the wedge portion being constructed of a flexible plastic, the wedge portion having a generally triangular configuration, the wedge portion having a top wall, a bottom wall, opposed side walls, a forward edge, and a raised rearward edge, the forward edge and the raised rearward edge being disposed whereby the top wall is angularly disposed, the top wall and the bottom wall each having an indentation formed therein disposed inwardly of the raised rearward edge, said edges are rounded and smooth to prevent damage to the window and window sill.

2. A window stabilizing device for preventing a loose window from rattling comprising, in combination:

a window having a lower edge;

a window sill adjacent the lower edge, wherein a space is present between the lower edge and the window sill; and a wedge portion selectively positioned between a lower edge of a window and a corresponding window sill to stop the window from rattling, the wedge portion having a generally triangular configuration, the wedge portion having a top wall, a bottom wall, opposed side walls, a forward edge, and a raised rearward edge, the forward edge and the raised rearward edge being disposed whereby the top wall is angularly disposed, said edges are rounded and smooth to prevent damage to the window and window sill.

3. The window stabilizing device as set forth in claim 2, wherein the top wall and the bottom wall each have a crescent shaped indentation formed therein disposed inwardly of the raised rearward edge having an abrasive surface within the indentation to facilitate handling of the wedge.

4. A window stabilizing method, for preventing a window from rattling, the window having a lower edge and a window sill adjacent the lower edge, comprising the steps of:

providing a wedge having a generally triangular configuration, having a top wall, a bottom wall, opposed side walls, a forward edge, and a raised rearward edge, said edges are smooth and rounded, wherein the top wall is angled toward the bottom wall toward the forward edge;

stabilizing the window and preventing the window from rattling by inserting the forward edge between the window lower edge and the window sill.

* * * * *